Sept. 23, 1969     E. A. NOWAK     3,468,648

METHOD AND APPARATUS FOR FORMING HOLLOW GLASS ARTICLES

Filed July 8, 1966

INVENTOR.
EDWARD A. NOWAK
BY J. F. Imrie &
W. A. Schaich
ATTORNEYS

United States Patent Office 3,468,648
Patented Sept. 23, 1969

3,468,648
METHOD AND APPARATUS FOR FORMING HOLLOW GLASS ARTICLES
Edward A. Nowak, Toledo, Ohio, assignor to Owens-Illinois, Inc., a corporation of Ohio
Filed July 8, 1966, Ser. No. 563,734
Int. Cl. C03b 9/32
U.S. Cl. 65—76                    6 Claims

ABSTRACT OF THE DISCLOSURE

In the forming of blown glass articles in which a predetermined pattern is formed in the interior of the glass by pressing the preform or parison with a plunger carrying the desired pattern. The parison and plunger are removed from the parison mold and the parison is then preliminarily expanded by applying pressure to the interior thereof. At this point the plunger may be retracted from the interior of the parison and the parison then blown to final form in the blow mold or the plunger may remain in the parison and the parison is rotated about its axis as the parison is blown in a "paste" mold.

---

This invention relates to a method and apparatus for forming hollow glass articles having predetermined patterns or designs in the glass and formed internally of the article.

More particularly, this invention relates to a method and apparatus for forming a parison with an irregularly shaped plunger so that when the parison is blown in a blow mold, the design imparted to the interior of the parison will be present in the interior of the article.

It has been the practice in the past, when forming glass containers with designs in the walls thereof, to form the design in relief in the wall of the blow mold.

As is well known, when a parison or preform is expanded within an iron mold, it is necessary that the mold and glass not be moved relative to each other. This is the present method used in the forming of glass containers.

In the formation of blown tumblers, it has been the practice to form a parison suspended from the end of a rotating spindle, with the spindle being moved while rotating to a position where it is enclosed in a "pasted" blow mold. The pasted mold is formed with a porous carbon and binder inner surface which is wet with water so that upon expansion of the parison by internal blowing of the parison, the hot glass moves into proximity to the wet, pasted wall causing the water to be transformed to steam. The steam forms a cushion between the glass and the mold. By this process a shaped glass article may be formed in which the outer surface has a superior lustre. This lustrous appearance is particularly desirable in tableware.

It has also been the practice when forming tumblers or tableware in which it is desired to produce ware having variations in wall thickness throughout its length, to chill the outside of the parison by contacting it with a chilled metallic member. This process is clearly taught in U.S. Patent 1,949,435. This process is known as "applying an optic to the glassware" and, as explained in the above-referred-to patent, the chill pattern which is placed in the exterior of the parison will result in variations in wall thickness where the cooler areas will be thicker in the blown ware. It should be understood that the exterior of the formed ware will be smooth and the interior will be irregular and presenting an optical effect due to this difference in wall thickness.

With the foregoing in view, it is an object of this invention to provide a process and apparatus for forming hollow glass articles having an optical effect.

It is a further object of this invention to form parisons with interior irregularities which will appear in the final ware as interior irregularities regardless of whether the ware is blown in a paste mold or iron mold.

Other and further objects will be apparent when taken in conjunction with the annexed sheet of drawings, wherein.

Figure 1:
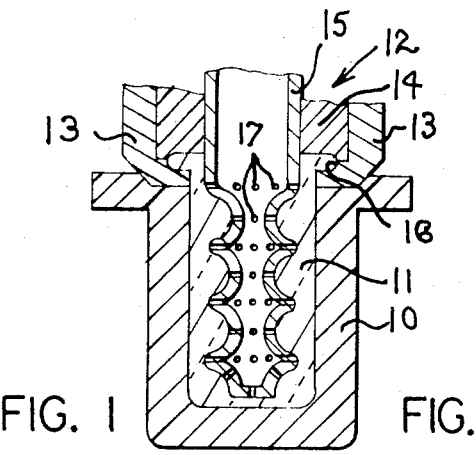
FIG. 1 is a vertical, sectional view showing the parison mold and plunger construction of the invention.

With specific reference to the drawings, a parison mold 10, within which a change of molten glass 11 has been placed, is contacted by a spindle 12 comprised of jaws 13 carried by an annular core member 14.

As can readily be seen when viewing FIG. 1, the lower end of the spindle jaws 13 conform to the upper surface of the mold 10, it being understood that the mold 10 may be a one-piece mold. The spindle jaws 13 normally are formed of two complementary members capable of opening and closing movement relative to the core member 14. Within the core member 14 a plunger 15 is vertically reciprocated by suitable motor means (not shown) whereby the plunger 15 may be moved downwardly within the molten glass 11 until the glass fills the void formed between the plunger 15 and the mold 10.

As shown, the spindle jaws 13 and the core member 14 form an annular recess 16 which, in the present instance, is intended to form the neck flange portion of a container. The plunger 15 is formed at its lower end with a series of annular convolutions corresponding to the desired pattern which it is intended to impart to the interior of the article to be formed.

It should be noted that the design of the member is such that it is incapable of withdrawal from the molten glass without disturbing the glass and it is also important that the glass entirely fill the recess formed between the plunger and the mold 10. To ensure that this area is completely filled, a plurality of small passages 17 are provided at spaced intervals throughout the lower end of the plunger 15. During the initial forming and movement of the plunger 15 into the molten glass, vacuum may be applied to the interior of the plunger. In this way, any air which might be entrapped at the interface between the plunger and the molten glass will be removed by the vacuum through the passages 17. These passages are of a size in the neighborhood of $\frac{1}{32}$ of an inch in diameter, being small enough that the glass will not enter the passages.

Figure 2:
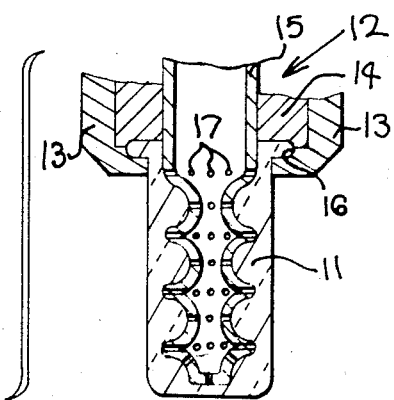
FIG. 2 is a view similar to FIG. 1 with the mold separated from the parison.
Figure 3:
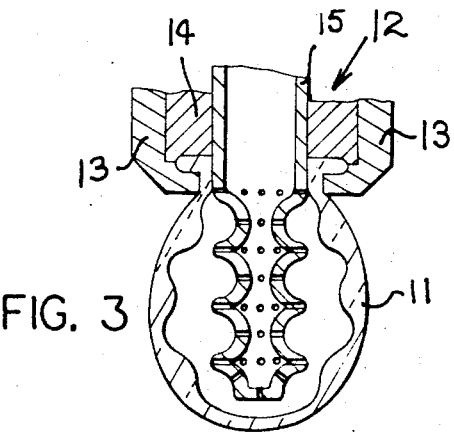
FIG. 3 is a view similar to FIG. 1 illustrating the preliminary puffing of the parison.
Figure 4:
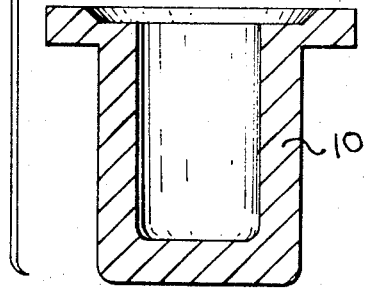
FIG. 4 is a vertical, sectional view of the parison expanded within the blow mold; and, FIG. 5 is a perspective view, partially broken away, of a glass article produced in accordance with the invention.

With the completion of the pressing of the glass into a shape defined by the plunger and the inner parison mold wall configuration, as shown in FIG. 1, the mold and spindle are separated by relatively moving the two members apart to the position shown in FIG. 2. With the removal of the parison and plunger, a preliminary puff of air under pressure is fed to the interior of the plunger 15. The introduction of air under pressure to the interior of the plunger 15 will pass out through the passages 17 and effectively expand the parison to the shape shown in FIG. 3. During this preliminary puff, illustrated in FIG. 3, the spindle 12 is rotated about its vertical axis to ensure the equal expansion of the parison and to ensure that the gravitational forces which will be acting on the parison will act substantially uniform throughout the circumference of the parison. Following the preliminary puffing of the parison, as shown in FIG. 3, the parison, which is carried by the spindle, is surrounded by the blow mold 18. With the mold 18 in position, the parison is expanded to the shape defined by the interior of the mold.

At this stage of the process, it is not necessary that the plunger remain in its down position and, if desired, the plunger may be withdrawn and a separate blow head inserted in place thereof to provide for the final expansion of the parison into the article shape. A container, such as that shown in FIG. 5, is the result of the process carried out by this invention and will present a container having an optical appearance substantially contrasting with that of the normal containers wherein the side walls are of substantially the same thickness throughout.

It should be pointed out that while the above description concerns itself principally with the blowing of a parison within a two-piece iron mold, it should be kept in mind that the mold 18 may be of the pasted type, in which case the spindle 12 continues its rotation during the expansion of the parison into the final shape.

Figure 5:
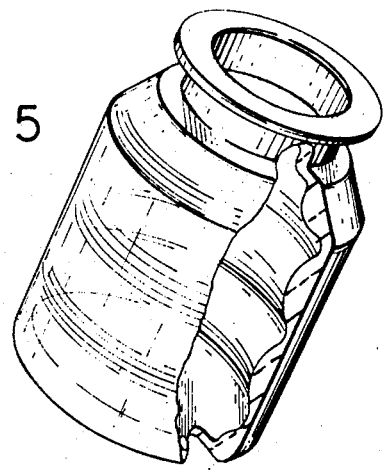

It should further be kept in mind that whether the final shape is to be a jar or bottle, as shown in FIG. 5, or a tumbler, is determined strictly by the outer configuration to which the ware is to eventually assume and when forming a tumbler or other tableware article, that portion of the glass which is carried by the spindle is normally removed in a conventional burn-off system and the discarded portion being referred to in the art as the "moil."

I claim:

1. A method of forming glass articles with internally extending projections in a desired pattern comprising, the steps of inserting a perforated, hollow plunger, having an external configuration corresponding to the desired pattern, within a body of molten glass confined in a blank mold, separating the glass and plunger from the blank mold, applying pressure to the interior of said plunger to expand the parison, and rotating the glass and plunger during expansion thereof to provide even expansion of the parison within a blow mold of the "paste mold" type.

2. A method of forming glass articles with internally extending projections in a desired pattern comprising, the steps of inserting a perforated, hollow plunger, having an external configuration corresponding to the desired pattern, within a body of molten glass confined in a blank mold, separating the glass and plunger from the blank mold, applying pressure to the interior of said plunger to first expand the parison an amount sufficient to clear the plunger, withdrawing the plunger after the first expansion of the parison, and then applying pressure to the interior of the parison to expand the parison within a blow mold.

3. A method of forming glass articles with internally extending projections in a desired pattern comprising, the steps of inserting a perforated, hollow plunger, having an external configuration corresponding to the desired pattern, within a body of molten glass confined in an external mold, apply a vacuum to the interior of said plunger to ensure complete contact with the molten glass and elimination of air entrapment, separating the glass and plunger from the external mold, applying pressure to the interior of said plunger to preliminarily expand the glass into a parison, further expanding the parison within a blow mold and rotating the glass and plunger during expansion of the glass to provide even expansion thereof.

4. The method of forming glass articles with internally extending projections in a desired pattern comprising, the steps of seating a spindle on a parison mold containing a charge of molten glass, inserting a perforated, hollow plunger, having an external configuration corresponding to the desired pattern, within the charge of molten glass confined in the parison mold, applying a vacuum to the interior of said plunger to ensure complete conformity of the molten glass with the plunger, separating the glass and plunger from the parison mold, applying presure to the interior of said plunger to preliminarily expand the glass away from the plunger, further expanding the parison within a blow mold and rotating the spindle during expansion of the glass within the blow mold of the "paste mold" type.

5. Apparatus for forming glass articles with internally extending projections in a desired pattern comprising, in combination a hollow spindle, a parison mold containing a charge of molten glass, a perforated, hollow plunger, having an external configuration corresponding to the desired pattern, extending coaxially through said spindle, means for applying a vacuum to the interior of said plunger to ensure complete conformity of the molten glass with the plunger, means for applying pressure to the interior of said plunger to preliminarily expand the glass away from the plunger, a blow mold within which the parison is expanded by internally applied pressure and means for rotating the spindle during expansion of the glass within the blow mold.

6. The apparatus of claim 5, wherein the external configuration of the plunger is a series of annular convolutions.

References Cited

UNITED STATES PATENTS 1,259,281  3/1918  Peiler _____ 65—80

S. LEON BASHORE, Primary Examiner

ARTHUR D. KELLOGG, Assistant Examiner

U.S. Cl. X.R.

65—79, 82, 110, 229, 282, 296, 362